(12) United States Patent
Zhu et al.

(10) Patent No.: US 11,792,704 B2
(45) Date of Patent: Oct. 17, 2023

(54) AVOIDING SIMULTANEOUS CONDITIONAL HANDOVER AND CONDITIONAL PRIMARY SCG CELL CHANGE

(71) Applicant: QUALCOMM Incorporated, San Diego, CA (US)

(72) Inventors: Xipeng Zhu, San Diego, CA (US); Punyaslok Purkayastha, San Diego, CA (US); Ozcan Ozturk, San Diego, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/240,524

(22) Filed: Apr. 26, 2021

(65) Prior Publication Data

US 2021/0337449 A1    Oct. 28, 2021

Related U.S. Application Data

(60) Provisional application No. 63/016,283, filed on Apr. 27, 2020.

(51) Int. Cl.
*H04W 36/08* (2009.01)
*H04W 74/08* (2009.01)

(52) U.S. Cl.
CPC ....... *H04W 36/08* (2013.01); *H04W 74/0833* (2013.01)

(58) Field of Classification Search
CPC . H04W 36/08; H04W 74/0833; H04W 76/20; H04W 36/0069; H04W 36/36;
(Continued)

(56) References Cited

U.S. PATENT DOCUMENTS

2020/0396661 A1* 12/2020 Wu .............. H04W 36/00

FOREIGN PATENT DOCUMENTS

WO    2019161742 A1    8/2019

OTHER PUBLICATIONS

Huawei ("(TP for LTE_feMob BL CR for TS 36.423): Avoidance of simultaneous CHO and CPC configuration", 3GPP TSG-RAN WG3 #107bis-e, R3-201877, Apr. 20-30, 2020, FTP uploaded on Apr. 10, 2020) (Year: 2020).*

(Continued)

*Primary Examiner* — Chi H Pham
*Assistant Examiner* — Ji-Hae Yea
(74) *Attorney, Agent, or Firm* — Arent Fox, LLP

(57) ABSTRACT

Example implementations include a method, apparatus and computer-readable medium of wireless communication at a secondary node (SN), comprising determining to perform conditional primary SCG cell (PSCell) change (CPC) of a user equipment (UE) to one of a set of target primary SCG cells within the SN different from a current primary SCG cell. The implementations further include generating a secondary cell modification message including identification information for the set of target primary SCG cells for the CPC. Additionally, the implementations further include transmitting the secondary cell modification message including the identification information for the set of target primary SCG cells for the CPC to a master node (MN) associated with the UE. Additionally, the implementations further include receiving a response message from the MN indicating a confirmation or a rejection of the secondary cell modification message. Example method, apparatus and computer-readable medium of wireless communication at the MN are included.

26 Claims, 17 Drawing Sheets

(58) Field of Classification Search
CPC .............. H04W 76/15; H04W 88/06; H04W 36/00692; H04W 36/00695; H04W 36/00698; H04W 36/083; H04W 36/085; H04W 36/087; H04W 36/13; H04W 36/362; H04L 5/001; H04L 5/0098
See application file for complete search history.

(56) References Cited

OTHER PUBLICATIONS

Huawei ("(TP for NR_Mob_enh BL CR for TS 37.340): Avoidance of simultaneous CHO and CPC configuration", 3GPP TSG-RAN WG3 #107bis-e, R3-201878, Apr. 20-30, 2020, FTP uploaded on Apr. 10, 2020) (Year: 2020).*

Huawei: (TP for NR_Mob_enh BL CR for TS 38.423): Avoidance of Simultaneous CHO and CPC Configuration, 3GPP TSG-RAN WG3 #107bis-e, 3GPP Draft, R3-201876, 3rd Generation Partnership Project (3GPP), Mobile Competence Centre, 650, Route Des Lucioles, F-06921 Sophia-Antipolis Cedex, France, vol. RAN WG3, No. E-Meeting, Apr. 20, 2020-Apr. 30, 2020, Apr. 10, 2020 (Apr. 10, 2020), 34 Pages, XP051873827.

International Search Report and Written Opinion—PCT/US2021/029487—ISA/EPO—dated Jul. 21, 2021.

LG Electronics Inc: "SCG Failure Handling with Conditional PSCell", 3GPP TSG-RAN WG2 Meeting #108 3GPP Draft, R2-1916207, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 18, 2019-Nov. 22, 2019, Nov. 8, 2019 (Nov. 8, 2019), pp. 1-3, XP051817751.

Qualcomm Incorporated: "Avoiding Simultaneous CHO and CPC", 3GPP TSG-RAN WG3 Meeting #107-bis-e, 3GPP Draft, R3-201798, 3rd Generation Partnership Project (3GPP), Mobile Competence Centre, 650, Route Des Lucioles, F-06921 Sophia-Antipolis Cedex, France, vol. RAN WG3, No. Online Meeting, Apr. 20, 2020-Apr. 30, 2020, Apr. 10, 2020 (Apr. 10, 2020), 2 Pages, XP051873771.

Qualcomm Incorporated: "SN Initiated Conditional Intra-SN Change", 3GPP TSG-RAN WG3 #107-e, 3GPP Draft, R3-200410, 3rd Generation Partnership Project (3GPP), Mobile Competence Centre, 650, Route Des Lucioles, F-06921 Sophia-Antipolis Cedex, France, vol. RAN WG3. No. E-Meeting, Feb. 24, 2020-Mar. 6, 2020 Feb. 15, 2020 (Feb. 15, 2020), 2 Pages, XP051854439.

* cited by examiner

AVOIDING SIMULTANEOUS CONDITIONAL HANDOVER AND CONDITIONAL PRIMARY SCG CELL CHANGE

CROSS-REFERENCE TO RELATED APPLICATION

This application claims priority to U.S. application Ser. No. 63/016,283, entitled "AVOIDING SIMULTANEOUS CONDITIONAL HANDOVER AND CONDITIONAL PRIMARY SCG CELL CHANGE," filed on Apr. 27, 2020, the disclosure of which is incorporated by reference herein in its entirety.

BACKGROUND

Technical Field

The present disclosure relates generally to communication systems, and more particularly, to apparatus and methods of avoiding simultaneous conditional handover (CHO) and conditional primary SCG cell change (CPC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. In particular, improving network communication procedures is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a secondary node (SN), comprising determining to perform conditional primary SCG cell group cell (PSCell or Primary SCG cell) change (CPC) of a user equipment (UE) to one of a set of target primary SCG cells within the SN different from a current primary SCG cell. The method further includes generating a secondary cell modification message including identification information for the set of target primary SCG cells for the CPC. Additionally, the method further includes transmitting the secondary cell modification message including the identification information for the set of target primary SCG cells for the CPC to a master node (MN) associated with the UE. Additionally, the method further includes receiving a response message from the MN indicating a confirmation or a rejection of the secondary cell modification message.

Another example implementation includes an apparatus for wireless communication at a secondary node (SN), comprising a memory and a processor in communication with the memory. The processor is configured to determine to perform conditional primary SCG cell (PSCell or Primary SCG cell) change (CPC) of a user equipment (UE) to one of a set of target primary SCG cells within the SN different from a current primary SCG cell. The processor is further configured to generate a secondary cell modification message including identification information for the set of target primary SCG cells for the CPC. Additionally, the processor further configured to transmit the secondary cell modification message including the identification information for the set of target primary SCG cells for the CPC to a master node (MN) associated with the UE. Additionally, the processor further configured to receive a response message from the MN indicating a confirmation or a rejection of the secondary cell modification message.

Another example implementation includes an apparatus for wireless communication at a secondary node (SN), comprising means for determining to perform conditional primary SCG cell (PSCell or Primary SCG cell) change (CPC) of a user equipment (UE) to one of a set of target primary SCG cells within the SN different from a current primary SCG cell. The apparatus further includes means for generating a secondary cell modification message including identification information for the set of target primary SCG cells for the CPC. Additionally, the apparatus further includes means for transmitting the secondary cell modification message including the identification information for the set of target primary SCG cells for the CPC to a master node (MN) associated with the UE. Additionally, the apparatus further includes means for receiving a response message from the MN indicating a confirmation or a rejection of the secondary cell modification message.

Another example implementation includes a computer-readable medium comprising stored instructions for wireless communication at a secondary node (SN), executable by a processor to determine to perform conditional primary SCG cell (PSCell or Primary SCG cell) change (CPC) of a user equipment (UE) to one of a set of target primary SCG cells within the SN different from a current primary SCG cell. The instructions are further executable to generate a secondary cell modification message including identification information for the set of target primary SCG cells for the CPC. Additionally, the instructions are further executable to transmit the secondary cell modification message including the identification information for the set of target primary SCG cells for the CPC to a master node (MN) associated with the UE. Additionally, the instructions are further executable to receive a response message from the MN indicating a confirmation or a rejection of the secondary cell modification message.

In another aspect, an example implementation includes a method of wireless communication at a master node (MN), comprising receiving, from a secondary node (SN), a secondary cell modification message for a user equipment (UE), wherein the secondary cell modification message includes identification information for a set of target primary secondary cell group cells (PSCell or Primary SCG cell) for a conditional PSCell change (CPC) of the UE from a current primary SCG cell to a different primary SCG cell within the SN. The method further includes determining whether the set of target primary SCG cells are suitable for performing the CPC. Additionally, the method further includes transmitting a response message to the SN indicating a confirmation or a rejection of the secondary cell modification message.

Another example implementation includes an apparatus for wireless communication at a master node (MN), comprising a memory and a processor in communication with the memory. The processor is configured to receive, from a secondary node (SN), a secondary cell modification message for a user equipment (UE), wherein the secondary cell modification message includes identification information for a set of target primary secondary cell group cells (PSCell or Primary SCG cell) for a conditional PSCell change (CPC) of the UE from a current primary SCG cell to a different primary SCG cell within the SN. The processor is further configured to determine whether the set of target primary SCG cells are suitable for performing the CPC. Additionally, the processor further configured to transmit a response message to the SN indicating a confirmation or a rejection of the secondary cell modification message.

Another example implementation includes an apparatus for wireless communication at a master node (MN), comprising means for receiving, from a secondary node (SN), a secondary cell modification message for a user equipment (UE), wherein the secondary cell modification message includes identification information for a set of target primary secondary cell group cells (PSCell or Primary SCG cell) for a conditional PSCell change (CPC) of the UE from a current primary SCG cell to a different primary SCG cell within the SN. The apparatus further includes means for determining whether the set of target primary SCG cells are suitable for performing the CPC. Additionally, the apparatus further includes means for transmitting a response message to the SN indicating a confirmation or a rejection of the secondary cell modification message.

Another example implementation includes a computer-readable medium comprising stored instructions for wireless communication at a master node (MN), executable by a processor to receive, from a secondary node (SN), a secondary cell modification message for a user equipment (UE), wherein the secondary cell modification message includes identification information for a set of target primary secondary cell group cells (PSCell or Primary SCG cell) for a conditional PSCell change (CPC) of the UE from a current primary SCG cell to a different primary SCG cell within the SN. The instructions are further executable to determine whether the set of target primary SCG cells are suitable for performing the CPC. Additionally, the instructions are further executable to transmit a response message to the SN indicating a confirmation or a rejection of the secondary cell modification message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
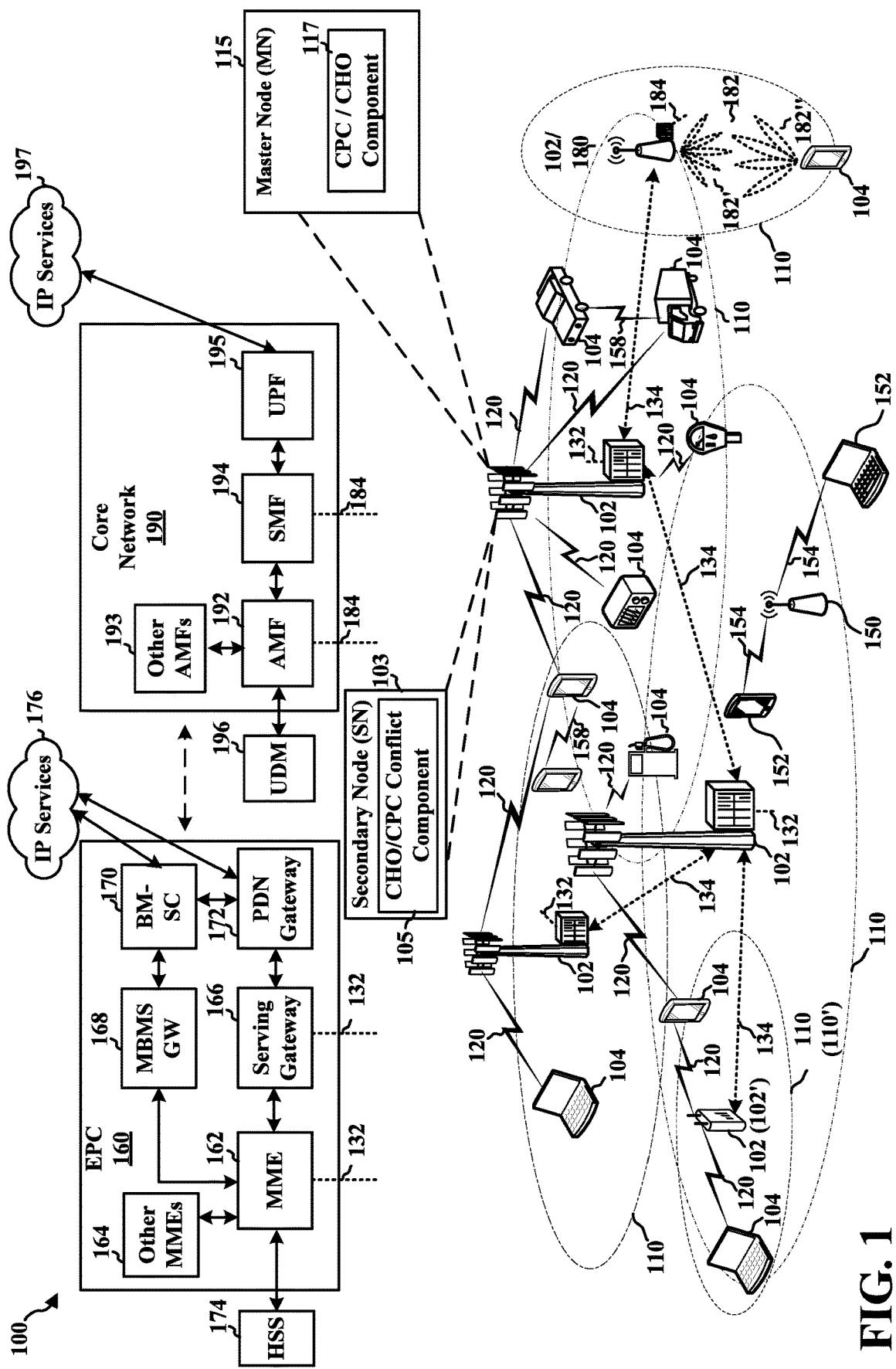
FIG. 1 is a diagram of an example of a wireless communications system and an access network, including a base station configured to avoid CPC and CHO conflicts.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure relates generally to wireless communication systems, and more particularly, to avoiding simultaneous conditional handover (CHO) and conditional primary secondary cell group cell (PSCell) change (CPC). In Multi-Radio Dual Connectivity (MR-DC) and New Radio Dual Connectivity (NR-DC), CHO (conditional handover) may collide with CPC (conditional primary SCG cell (PSCell) change). In other words, the user equipment (UE) may receive both a CHO and CPC request and be confused as to which request to follow, and/or a race condition may be triggered by receipt of both CHO and CPC requests.

The present disclosure provides apparatus and methods that enable a secondary node (SN) to inform a master node (MN) of a CPC, and include a CPC target PSCell list. For example, the SN may include the CPC target PSCell list in a modification message, such as in an information element of a Modification Required message. This provides the MN with notice of the CPC, and allows the MN to determine whether the target PSCells in the list are suitable for the CPC procedure. In response, the SN receives an acceptance or refusal of the modification message, and hence of the CPC, based on the suitability of one or more of the target PSCells. In some cases, the SN may receive a response that identifies a rejected CPC PSCell list and/or an approved CPC PSCell list.

Further, the SN may inform the MN when the CPC is complete by either transmitting a new message, such as an SN Modification Complete message, or by performing a PSCell change procedure.

In another aspect, even after receiving the confirmation the CPC procedure, the present disclosure provides apparatus and methods for the SN to receive a CPC cancel message from the MS. For instance, the MN may determine that the UE is about to lose a connection and should be handed over. In this instance, the MN can initiate the CHO and send the CPC cancel indication to the SN. This terminates the CPC procedure and enables the UE to be handed over to a new cell based on the CHO.

In a further aspect, the present disclosure provides apparatus and methods that enable the MN to enable or disable CPC. In some examples, the CPC may be an inter-CPC procedure (e.g., for condition SN changes), or an intra-CPC procedure. In this case, before CHO is initiated, the MN tells SN not to perform CPC by including a forbid or not allowed indication, e.g., a "forbid CPC" or "CPC not allowed" in an X2/Xn SN Modification/Addition Request, to forbid CPC during CHO. Optionally, the MN may include a "CPC allowed" indication in the SN Modification/Addition Request message when there is no conflict with CHO. After the CHO, the target MN can remove the CPC restriction by including "CPC allowed" in SN Modification procedure.

In yet another aspect, the present disclosure provides apparatus and methods that allow other network implementations, such as via an operation, administrative, and management (OAM) entity, to be used to avoid simultaneous CPC and CHO. For example, any of the signaling described herein, such as but not limited to the "forbid CPC" noted above, can be carried over OAM signaling.

Thus, the present solution improves the efficiency of wireless network operations at network-based entities, e.g., base stations, and at UEs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system and an access network 100 (also referred to as a wireless wide area network (WWAN)) includes a base station 102, including a master node (MN) and a secondary node (SN), in communication with a user equipment (UE) 104, wherein one or more of the base stations 102 are configured to avoid simultaneous CPC and CHO as described herein. For example, one or more of the base stations 102 may include a secondary node (SN) 103 operating a CHO/CPC conflict component 105 that is configured to avoid conflicting CPC and CHO procedures. Similarly, one or more of the base stations 102 may include a master node (SN) 115 operating a CPC/CHO component 117 that is configured to communicate in cooperation with the CHO/CPC conflict component 105 of the SN 103 to avoid conflicting CPC and CHO procedures. Details of the operation of these components is presented in more detail below. Thus, the present solution improves network communications at one or more base stations 102 and reduces confusion or errors at the UE 104.

In the wireless communications system and an access network 100, the base stations 102 and UEs 104 may additionally be in communication with an Evolved Packet Core (EPC) 160 and/or another core network 190, such as but not limited to a 5G Core (5GC). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is coupled with the PDN Gateway 172. The PDN Gateway 172 provides UE IP address allocation as well as other functions. The PDN Gateway 172 and the BM-SC 170 are coupled with the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is coupled with the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
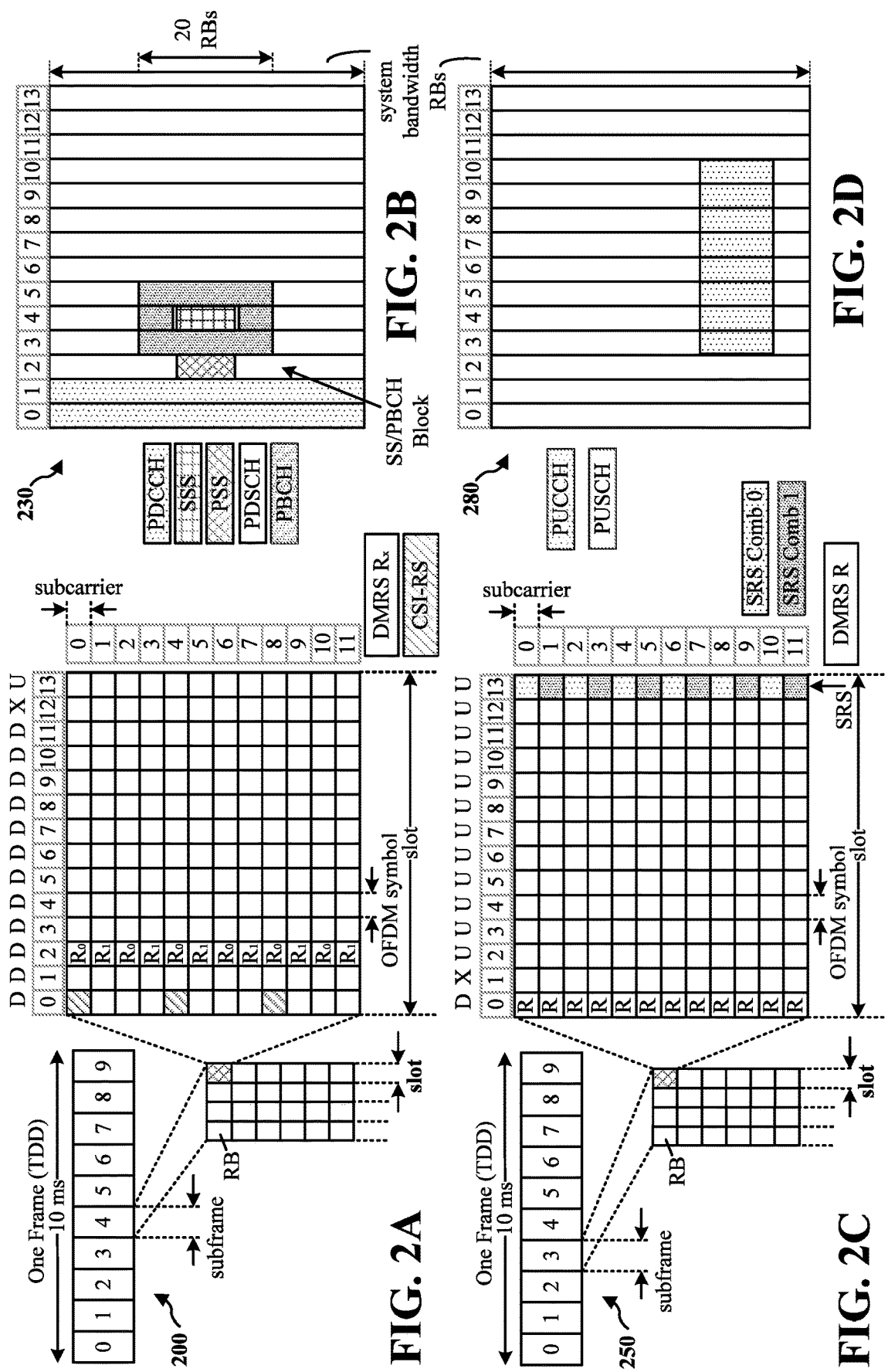
FIG. 2A is a diagram illustrating an example of a first 5G/NR frame, in accordance with some aspects of the present disclosure.
FIG. 2B is a diagram illustrating an example of DL channels within a 5G/NR subframe, in accordance with some aspects of the present disclosure.
FIG. 2C is a diagram illustrating an example of a second 5G/NR frame, in accordance with some aspects of the present disclosure.
FIG. 2D is a diagram illustrating an example of UL channels within a 5G/NR subframe, in accordance with some aspects of the present disclosure.

Referring to FIGS. 2A to 2D, examples of different frame structures and resources may be utilized by the base station 102 and/or the UE 104 for communications as described herein. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
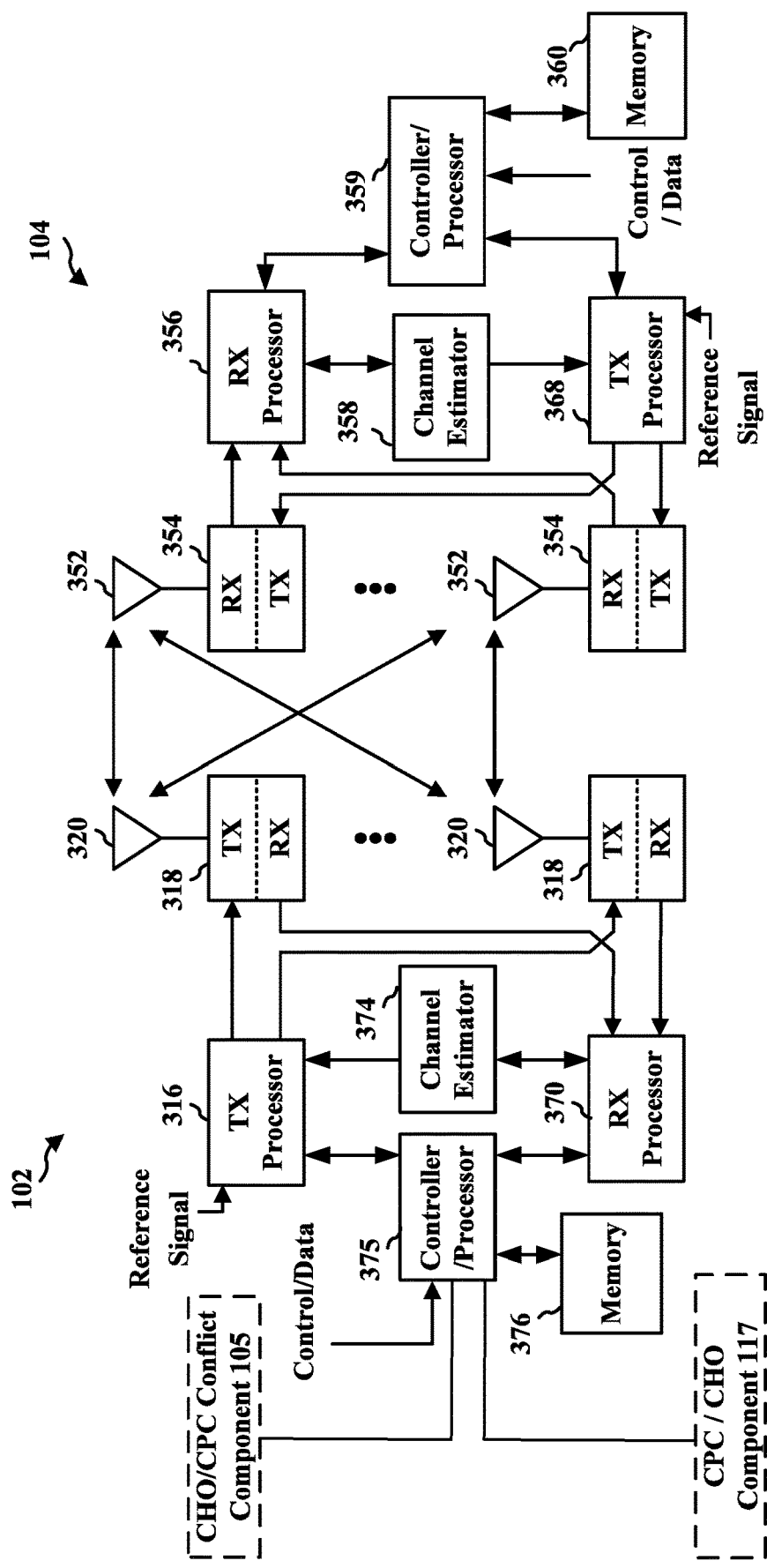
FIG. 3 is a diagram of an example of components of the base station and the user equipment.

Referring to FIG. 3, example components of the base station 102 and of the UE 104 are used for communication between one another in the access network 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At the UE 104, at least one of the TX processor 368, the RX processor 356, and the controller/processor 359 may be configured to perform aspects in connection with the features discussed herein.

At the base station, at least one of the TX processor 316, the RX processor 370, and the controller/processor 375 may be configured to perform aspects in connection with the CHO/CPC conflict component 105 and/or the CPC/CHO component 117 of FIG. 1 and/or as described elsewhere herein.

Figure 4:
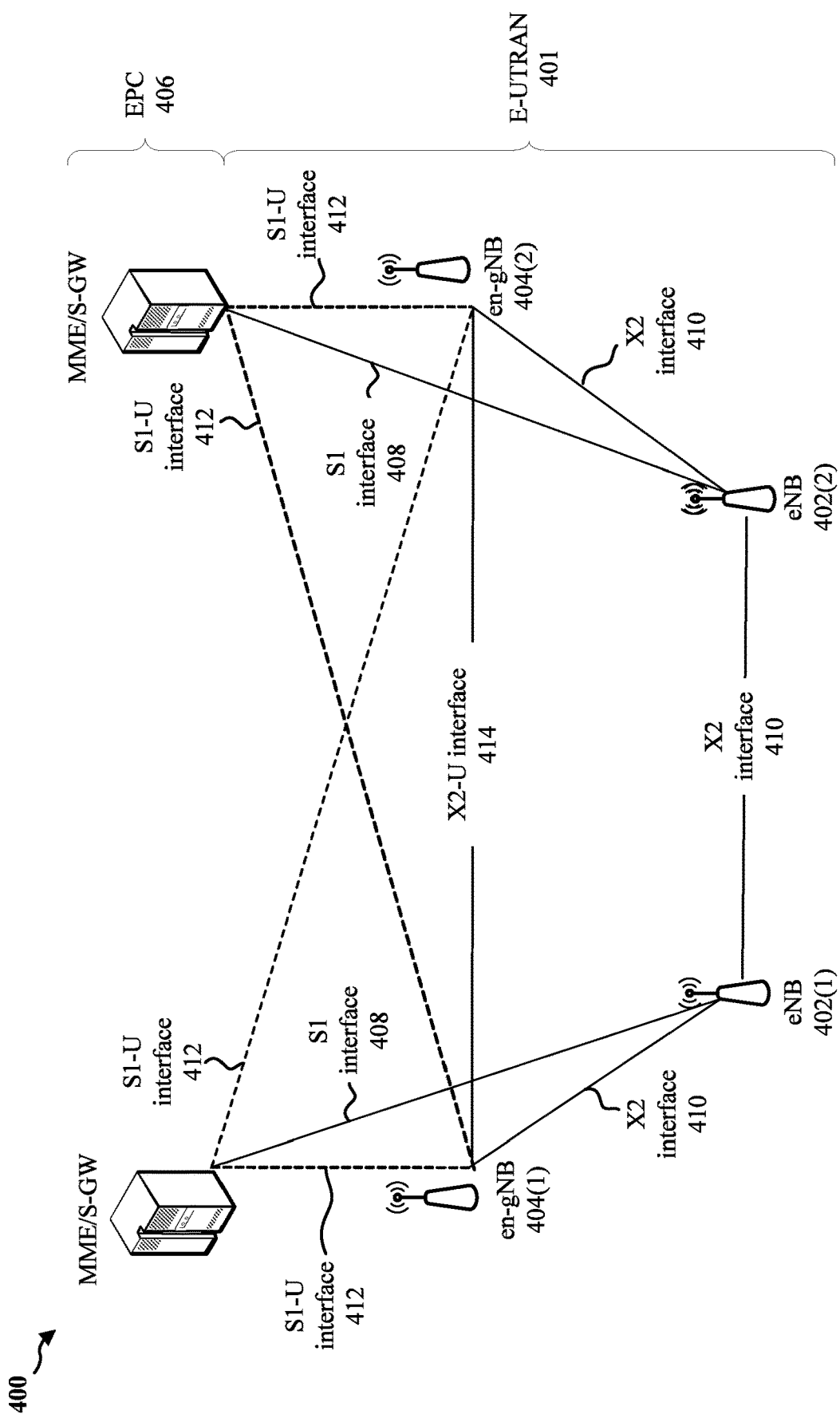
FIG. 4 is a schematic diagram of an example dual connectivity architecture in which the features of the present disclosure may be implemented.

Referring to FIG. 4, an example of a dual connectivity architecture 400 in which features of the present disclosure may be utilized represents a Multi-Radio Dual Connectivity (MR-DC) scenario.

MR-DC is a generalization of the Intra-E-UTRA Dual Connectivity (DC), where a multiple receive/transmit (Rx/Tx) capable UEs may be configured to utilize resources provided by two different nodes, which may be connected via non-ideal backhaul, one providing NR access and the other one providing either E-UTRA or NR access. One node acts as the MN and the other as the SN. The MN and SN are connected via a network interface and at least the MN is coupled with the core network. The MN and/or the SN can be operated with shared spectrum channel access. Further, all functions for a UE may be used for an IAB-MT unless otherwise stated. Similar as specified for UE, the IAB-MT can access the network using either one network node or using two different nodes with EN-DC and NR-DC architectures. In EN-DC, the backhauling traffic over the E-UTRA radio interface is not supported.

In particular, dual connectivity architecture 400 is an example of E-UTRA-NR Dual Connectivity (EN-DC). E-UTRAN 401 supports MR-DC via EN-DC, in which a UE (not shown in FIG. 4) is coupled with one eNB 402(1) that acts as a MN and one en-gNB 404(1) that acts as a SN. The eNB 402(1) is coupled with the EPC 406 via the S1 interface 408 and to the en-gNB 404(1) via the X2 interface 410. The en-gNB 404(1) might also be coupled with the EPC 406 via the S1-U interface 412 and other en-gNBs (e.g., en-gNBs 404(2)) via the X2-U interface 414.

The present features may also be implemented in NG-RAN E-UTRA-NR Dual Connectivity (NGEN-DC), in which a UE is coupled with one ng-eNB that acts as a MN and one gNB that acts as a SN. Further, the present features may also be implemented in NR-E-UTRA Dual Connectivity (NE-DC), in which a UE is coupled with one gNB that acts as a MN and one ng-eNB that acts as a SN. Additionally, the present features may also be implemented in NR-NR Dual Connectivity (NR-DC), in which a UE is coupled with one gNB that acts as a MN and another gNB that acts as a SN. In addition, NR-DC can also be used when a UE is coupled with two gNB-DUs, one serving the MCG and the other serving the SCG, coupled with the same gNB-CU, acting both as a MN and as a SN. In some cases, the UE may be coupled with one base station having different cells with one acting as the MN and the other as the SN.

Figure 5:
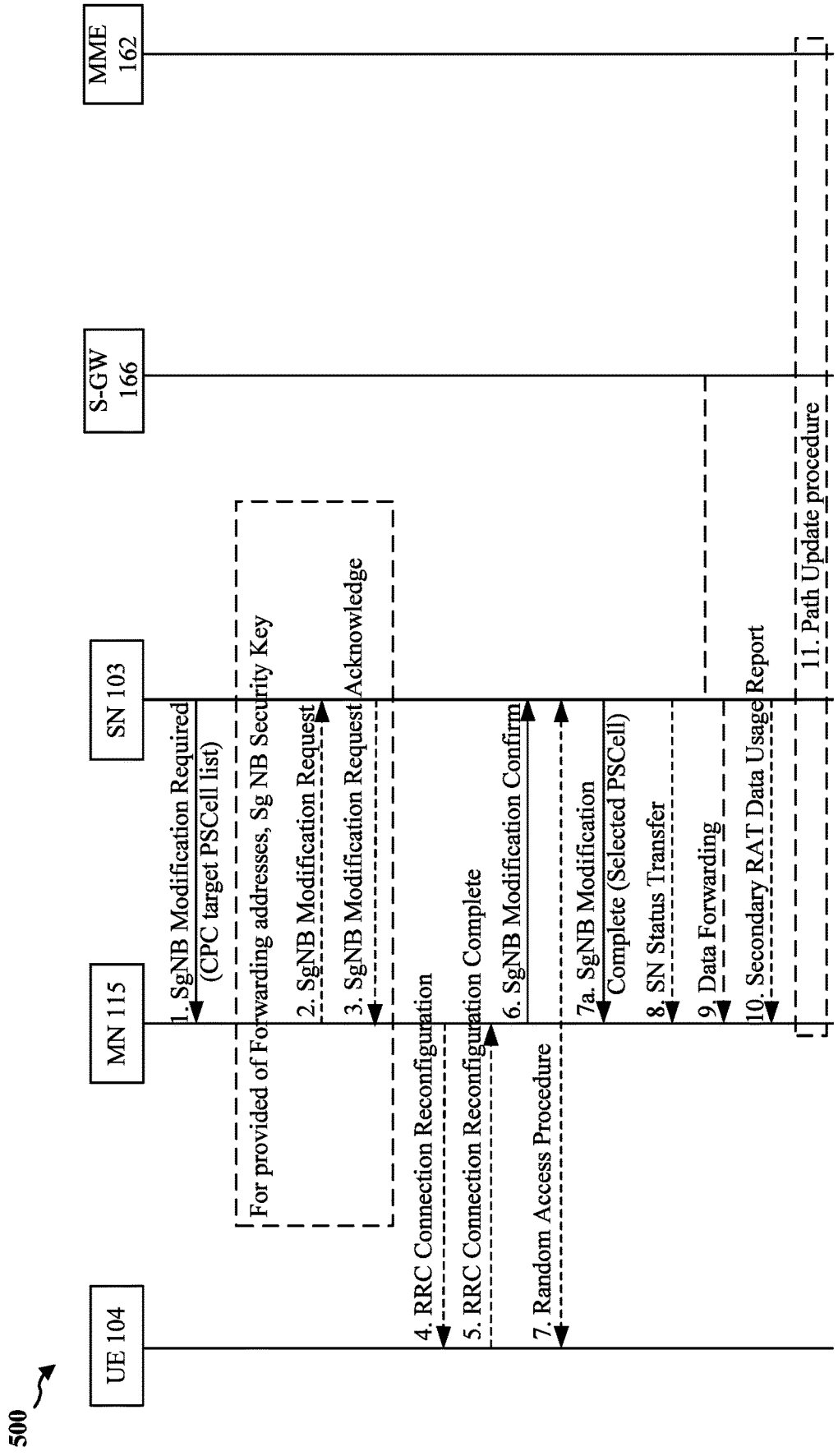
FIG. 5 is a message flow diagram of a method of wireless communications to avoid CPC and CHO conflicts according to aspects described herein.

Referring to FIG. 5, an example of a method 500 of an SN informing an MN before an intra-SN CPC may be used to avoid simultaneous CPC and CHO.

At step 1: When SN 103 decides to perform CPC, SN 103 sends SgNB Modification Required message to MN 115, including CPC target PSCell list. The inclusion of the CPC target PSCell list indicates to the MN 115 that CPC will start.

If the MN 115 has no ongoing CHO and agrees with the CPC, e.g., if one or more of the CPC target PSCell list are suitable targets, then the MN 115 may subsequently perform one of two actions. If the SN 103 included a CG-Config→scg-CellGroupConfig (e.g., including the RRCReconfiguration message to the UE 104) in SgNB Modification Request, then the MN 115 sends it to the UE 104 in step 4. Alternatively, the MN 115 sends an SgNB Modification Confirmation message to the SN in step 6.

Otherwise, the MN 115 rejects the SN 103 by sending an SgNB Modification Refuse and does not send the RRCReconfiguration message to the UE 104. The MN decision as to suitability of the CPC may be based on shared configuration (UE baseband processing capability, UE band combination, UE power) or ongoing/planned CHO.

Optionally, the rejection may be a partial rejection, i.e. some PSCells are accepted, some are rejected. For each rejected PSCell, the MN 115 may indicate a cause, such as but not limited to CHO ongoing, UE baseband processing capability restriction, UE band combination capability restriction, insufficient power, or insufficient resource.

At step 7a, after the CPC, the SN 103 tells the MN 115 that the CPC is complete with the UE 104 selected PSCell by either: Option A: a new message, referred to herein as an SgNB Modification Complete message; or, Option B: an SN initiated SN modification procedure, i.e. the PSCell change procedure as defined in section 10.6 of 3GPP TS 37.340.

It is noted that steps 2, 3, 5, 7, and 8-11 are not described for conciseness but include the signaling as indicated.

Figure 6:
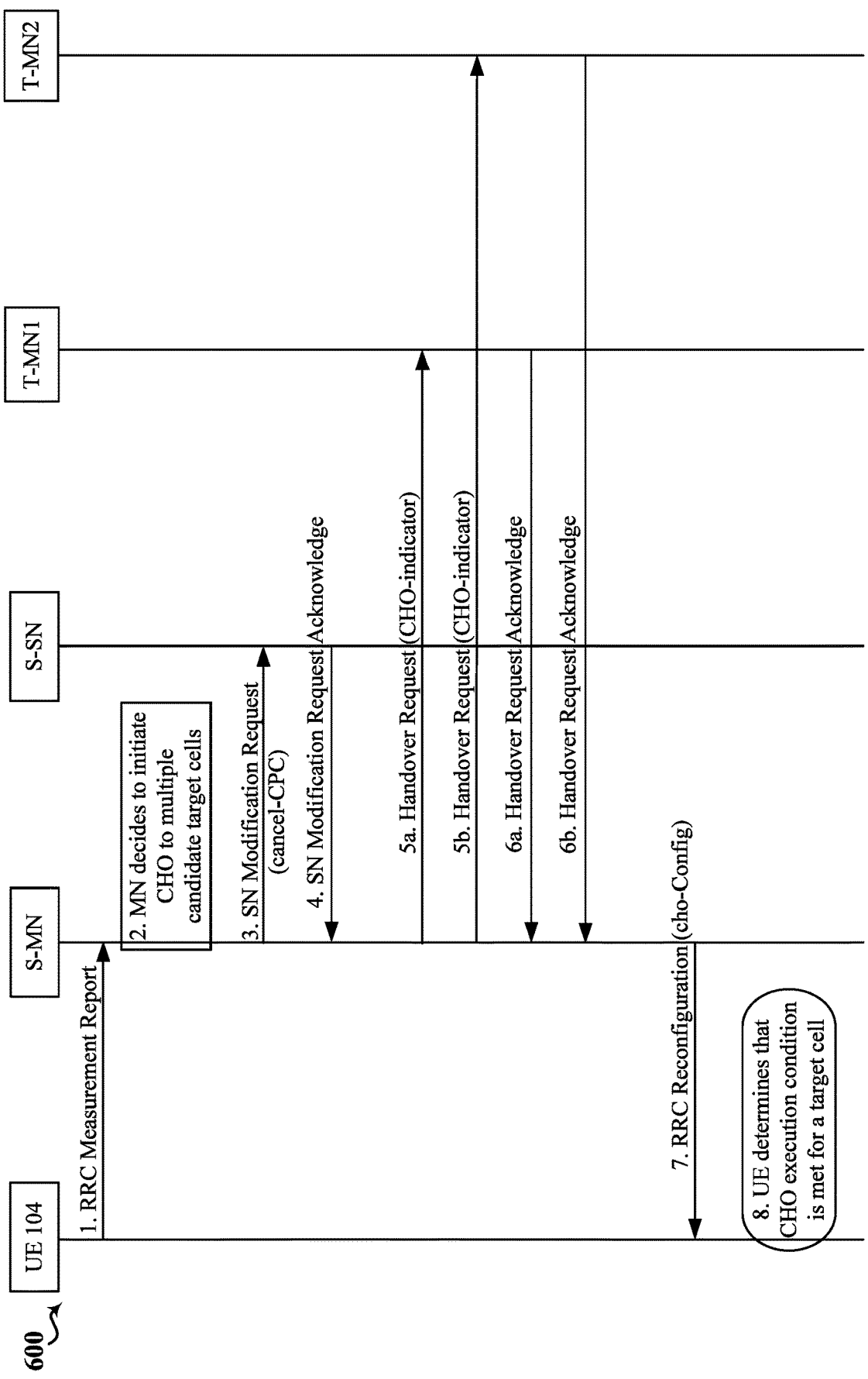
FIG. 6 is a message flow diagram of a method of wireless communications to cancel a CPC according to aspects described herein.
Figure 7:
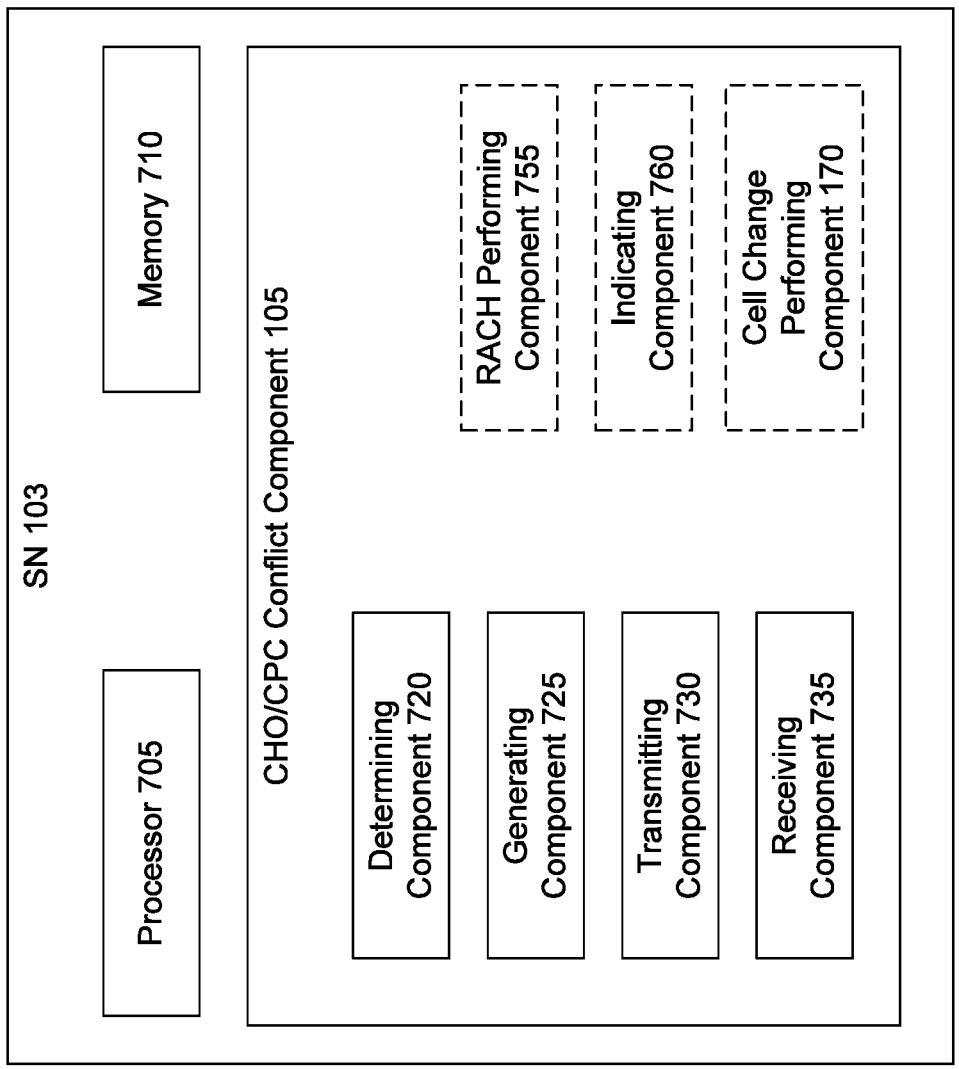
FIG. 7 is a block diagram of an SN including components for performing the actions described herein.
Figure 8:
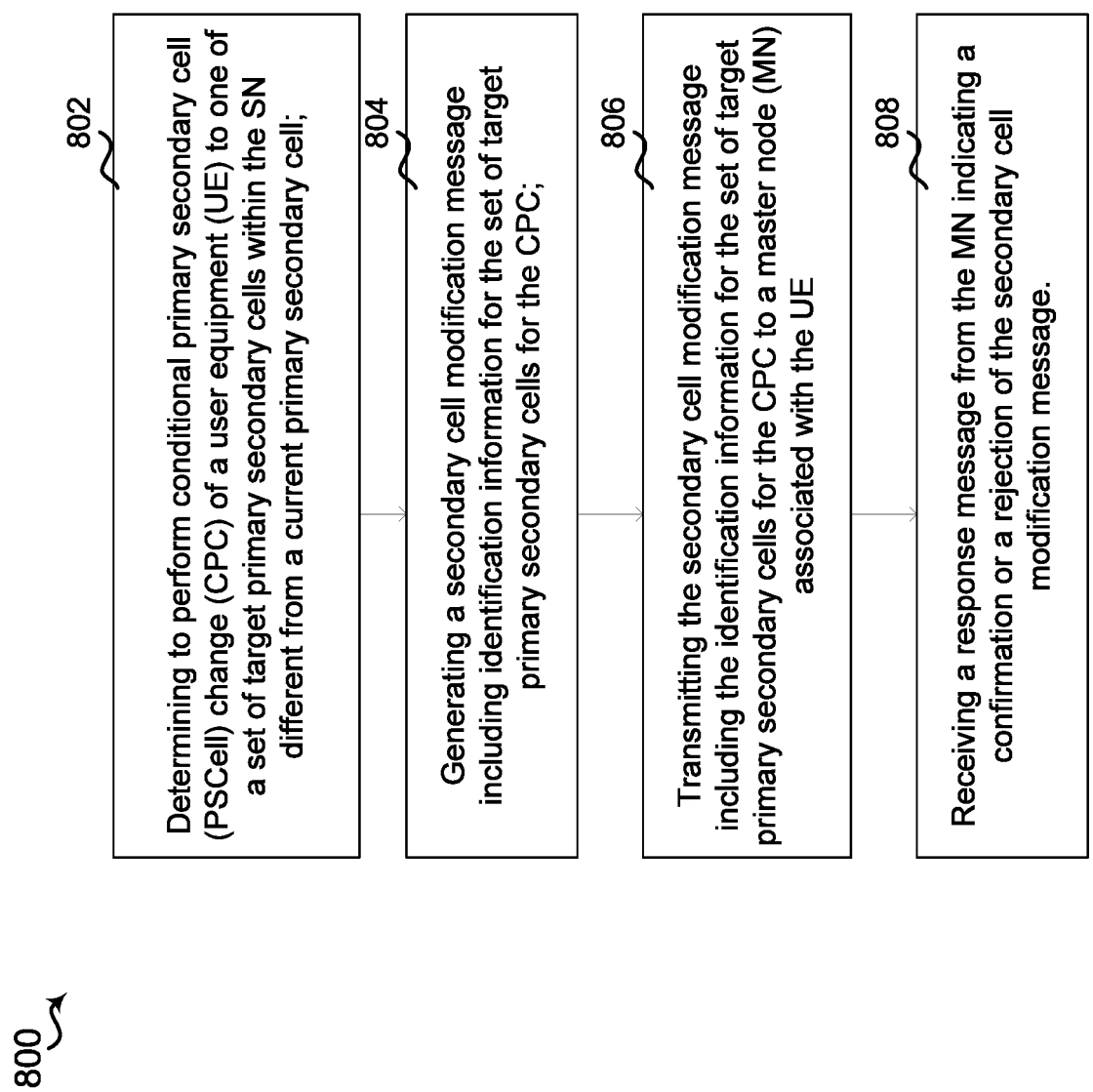
FIG. 8 is a flowchart of a first example method of wireless communication by the SN for avoiding CPC and CHO conflicts, as described herein.

Referring to FIG. 6, an example of a method 600 of an MN-initiated CPC cancelation may be performed by the MN during the CPC process of FIG. 5.

During CPC, it is possible that the MN 115 has an urgent need for CHO. In this situation, the MN 115 can ask the SN 103 to cancel the ongoing CPC (e.g., of FIG. 5).

For example, the MN 115 can include a "CPC cancel" indication in a SN Modification Request message. In response to the CPC cancel indication, the SN 103 shall send RRC Reconfiguration to the UE 104 to cancel the CPC. After that, the SN 103 sends an SN Modification Request Acknowledge to MN including a secondary cell group (SCG) configuration in a cell group configuration information element (CG-Config IE). When the CPC cancel indication is received by the SN 103, if the CPC is complete, the SCG configuration is the new configuration associated with the UE selected PSCell. Otherwise, it is the old SCG configuration before CPC. Further, the SN 103 performs the CPC-cancel indication by sending an RRCReconfiguration message to the UE 104 to remove the candidate PSCells.

Referring to FIGS. 7-11, in operation, the SN 103 may perform a method 800 of wireless communication, by such as via execution of CHO/CPC conflict component 105 by processor 705 and/or memory 710.

At block 802, the method 800 includes determining to perform conditional primary SCG cell (PSCell) change (CPC) of a user equipment (UE) to one of a set of target primary SCG cells within the SN different from a current primary SCG cell. For example, in an aspect, SN 103, processor 705, memory 710, CHO/CPC conflict component 105, and/or determining component 720 may be configured to or may comprise means for determining to perform conditional primary SCG cell (PSCell) change (CPC) of a user equipment (UE) to one of a set of target primary SCG cells within the SN different from a current primary SCG cell as described herein.

At block 804, the method 800 includes generating a secondary cell modification message including identification information for the set of target primary SCG cells for the CPC. For example, in an aspect, SN 103, processor 705, memory 710, CHO/CPC conflict component 105, and/or generating component 725 may be configured to or may comprise means for generating a secondary cell modification message including identification information for the set of target primary SCG cells for the CPC.

For example, the generating at block 804 may include generating the secondary cell modification message to further include a secondary cell group configuration message configured for transmitting to the UE.

At block 806, the method 800 includes transmitting the secondary cell modification message including the identification information for the set of target primary SCG cells for the CPC to a master node (MN) associated with the UE. For example, in an aspect, SN 103, processor 705, memory 710, CHO/CPC conflict component 105, and/or transmitting component 730 may be configured to or may comprise means for transmitting the secondary cell modification message including the identification information for the set of target primary SCG cells for the CPC to a master node (MN) associated with the UE.

At block 808, the method 800 includes receiving a response message from the MN indicating a confirmation or a rejection of the secondary cell modification message. For example, in an aspect, SN 103, processor 705, memory 710, CHO/CPC conflict component 105, and/or receiving component 735 may be configured to or may comprise means for receiving a response message from the MN indicating a confirmation or a rejection of the secondary cell modification message.

For example, the receiving at block 808 may include receiving a modification confirmation message indicating the confirmation of the secondary cell modification message, or receiving a modification refuse message indicating the rejection of all or a part of the secondary cell modification message. Further, the modification refuse message may include a cause code that indicates a reason for the rejection and/or rejected cell information that identifies one or more of the set of target primary SCG cells that are not suitable target primary SCG cells.

Figure 9:
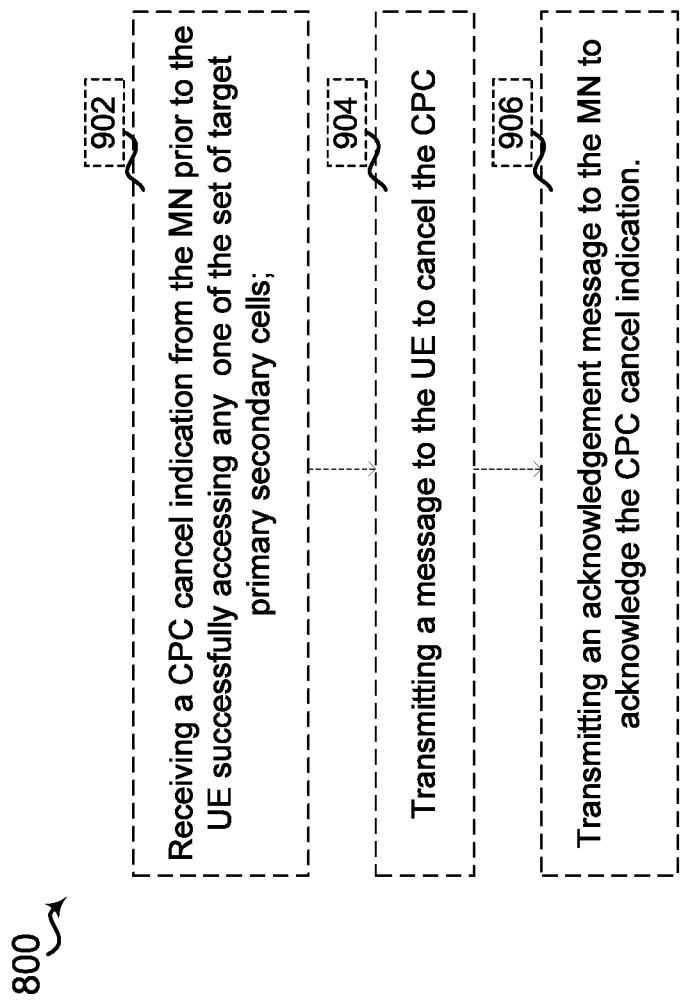
FIG. 9 is a flowchart of a second example method of wireless communication by the SN for avoiding CPC and CHO conflicts, as described herein.

In an optional aspect, referring to FIG. 9, at block 902, the method 800 may further include receiving a CPC cancel indication from the MN prior to the UE successfully accessing any one of the set of target primary SCG cells. For example, in an aspect, SN 103, processor 705, memory 710, CHO/CPC conflict component 105, and/or receiving component 735 may be configured to or may comprise means for receiving a CPC cancel indication from the MN prior to the UE successfully accessing any one of the set of target primary SCG cells.

For example, the receiving at block 902 may include receiving a modification request including the CPC cancel indication, and wherein transmitting the acknowledgement message includes transmitting a modification request acknowledgement message including a secondary cell group configuration in a cell group configuration information element.

In this optional aspect, at block 904, the method 800 may further include transmitting a message to the UE to cancel the CPC. For example, in an aspect, SN 103, processor 705, memory 710, CHO/CPC conflict component 105, and/or transmitting component 730 may be configured to or may comprise means for transmitting a message to the UE to cancel the CPC.

In this optional aspect, at block 906, the method 800 may further include transmitting an acknowledgement message to the MN to acknowledge the CPC cancel indication. For example, in an aspect, SN 103, processor 705, memory 710, CHO/CPC conflict component 105, and/or transmitting component 730 may be configured to or may comprise means for transmitting an acknowledgement message to the MN to acknowledge the CPC cancel indication.

Figure 10:
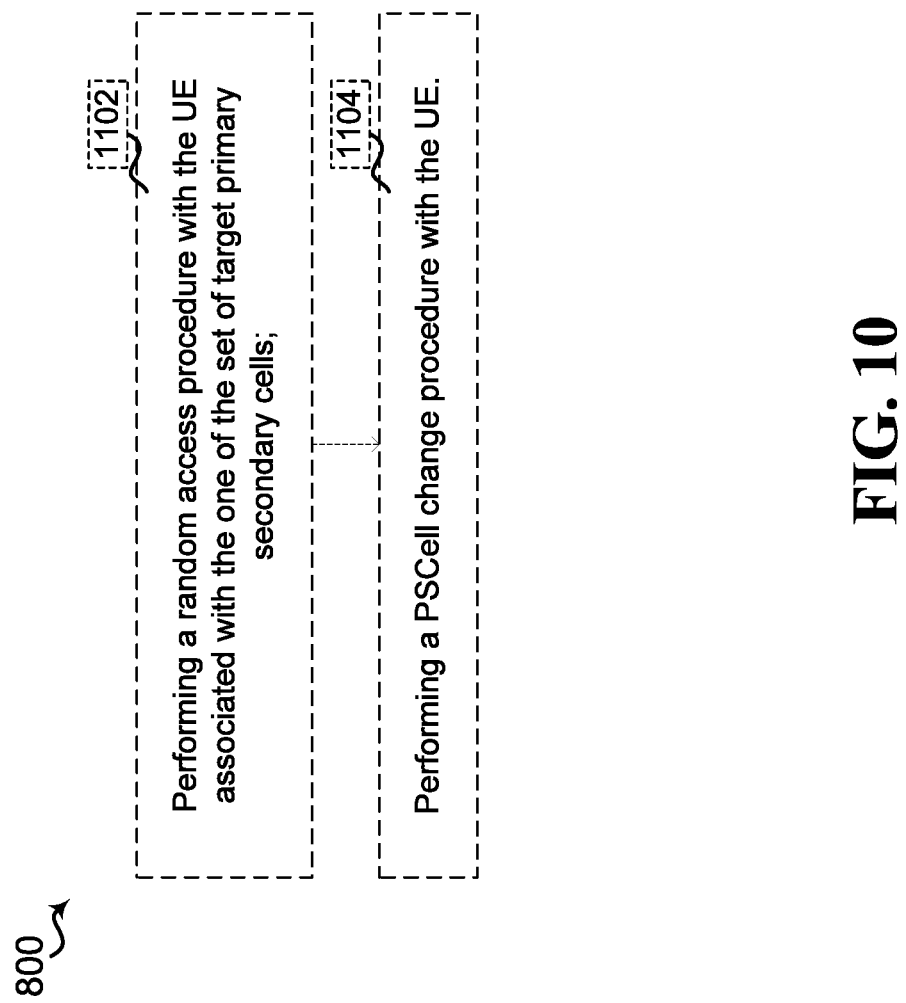
FIG. 10 is a flowchart of a third example of wireless communication by the SN for avoiding CPC and CHO conflicts, as described herein.

Referring to FIG. 10, in an optional aspect, at block 1002, the method 800 may further include performing a random access procedure with the UE associated with the one of the set of target primary SCG cells. For example, in an aspect, SN 103, processor 705, memory 710, CHO/CPC conflict component 105, and/or RACH performing component 755 may be configured to or may comprise means for performing a random access procedure with the UE associated with the one of the set of target primary SCG cells.

In this optional aspect, at block 1004, the method 800 may further include indicating a CPC complete with a modification complete message or an SN modification required message to the MN, after the UE successfully accesses a UE selected primary SCG cell from the set of target primary SCG cells, and including a UE selected primary SCG cell identifier of the UE selected primary SCG cell from the set of target primary SCG cells. For example, in an aspect, SN 103, processor 705, memory 710, CHO/CPC conflict component 105, and/or indicating component 760 may be configured to or may comprise means for indicating a CPC complete with a modification complete message or an SN modification required message to the MN, after the UE successfully accesses a UE selected primary SCG cell from the set of target primary SCG cells, and including a UE selected primary SCG cell identifier of the UE selected primary SCG cell from the set of target primary SCG cells.

Figure 11:
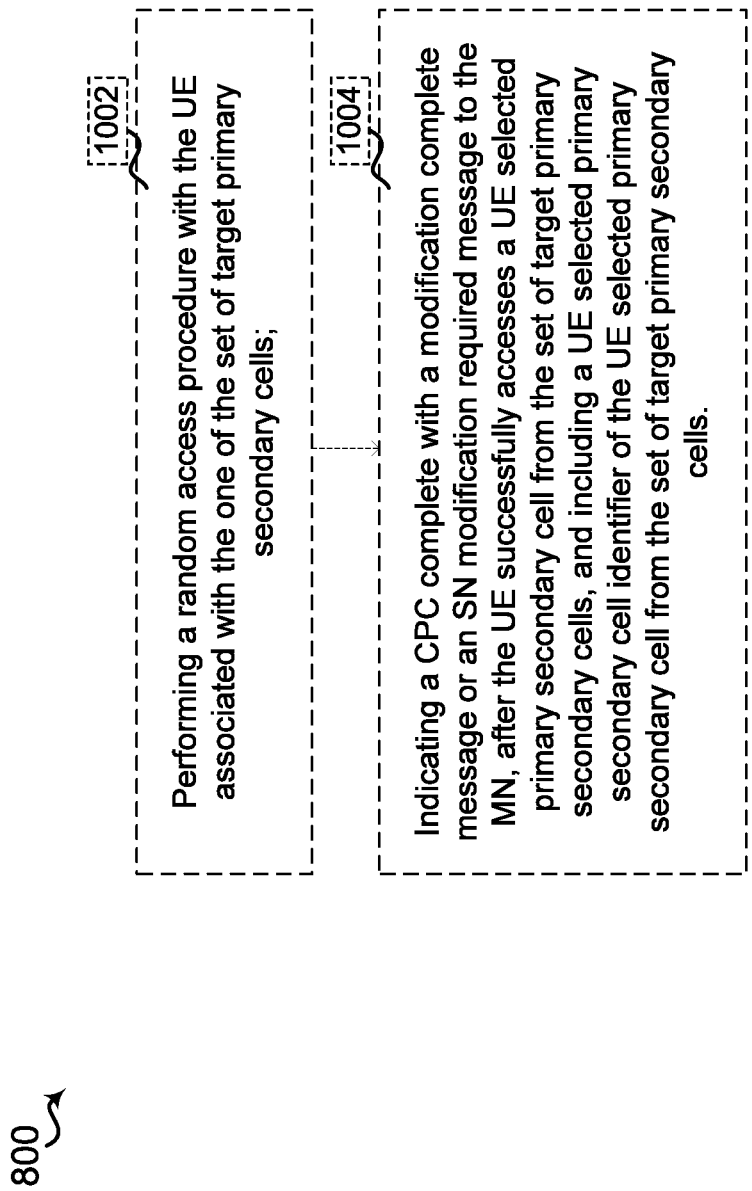
FIG. 11 is a flowchart of a fourth example method of wireless communication by the SN for avoiding CPC and CHO conflicts, as described herein.
Figure 12:
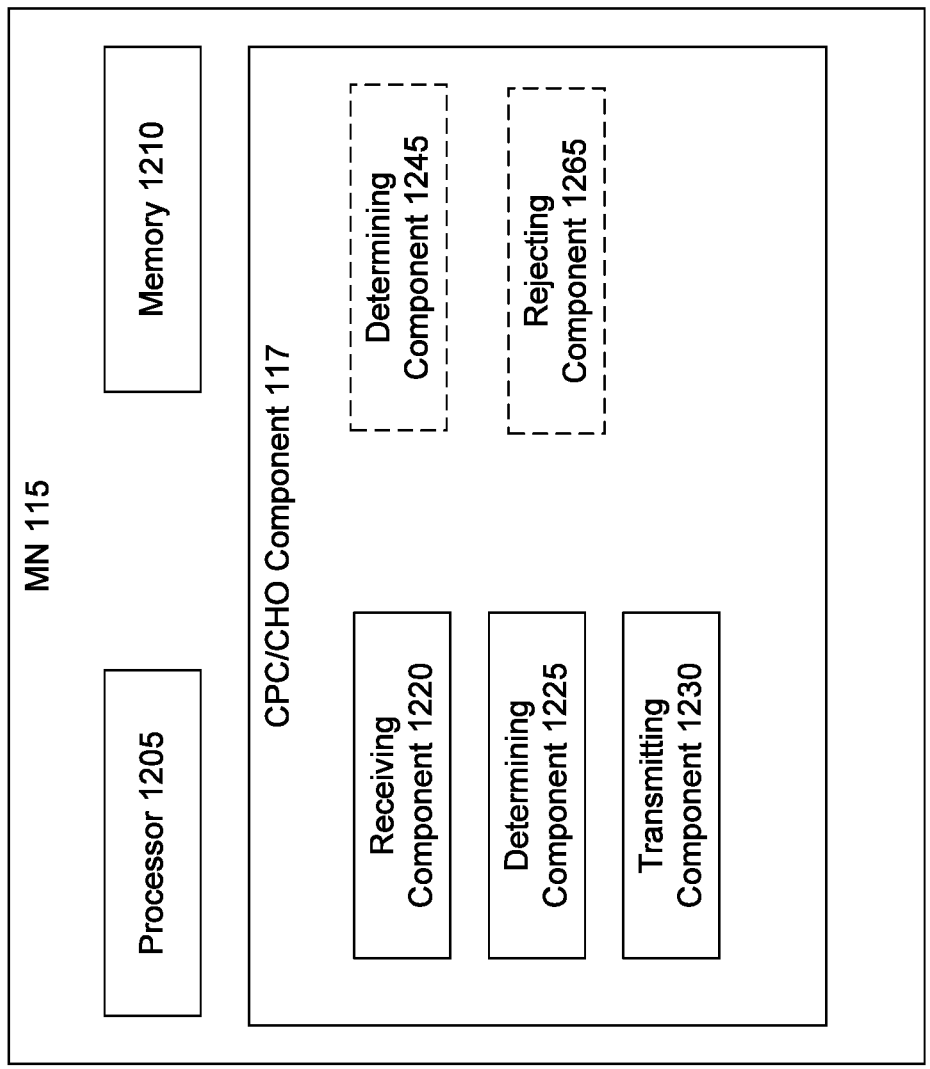
FIG. 12 is a block diagram of an MN including components for performing the actions described herein.
Figure 13:
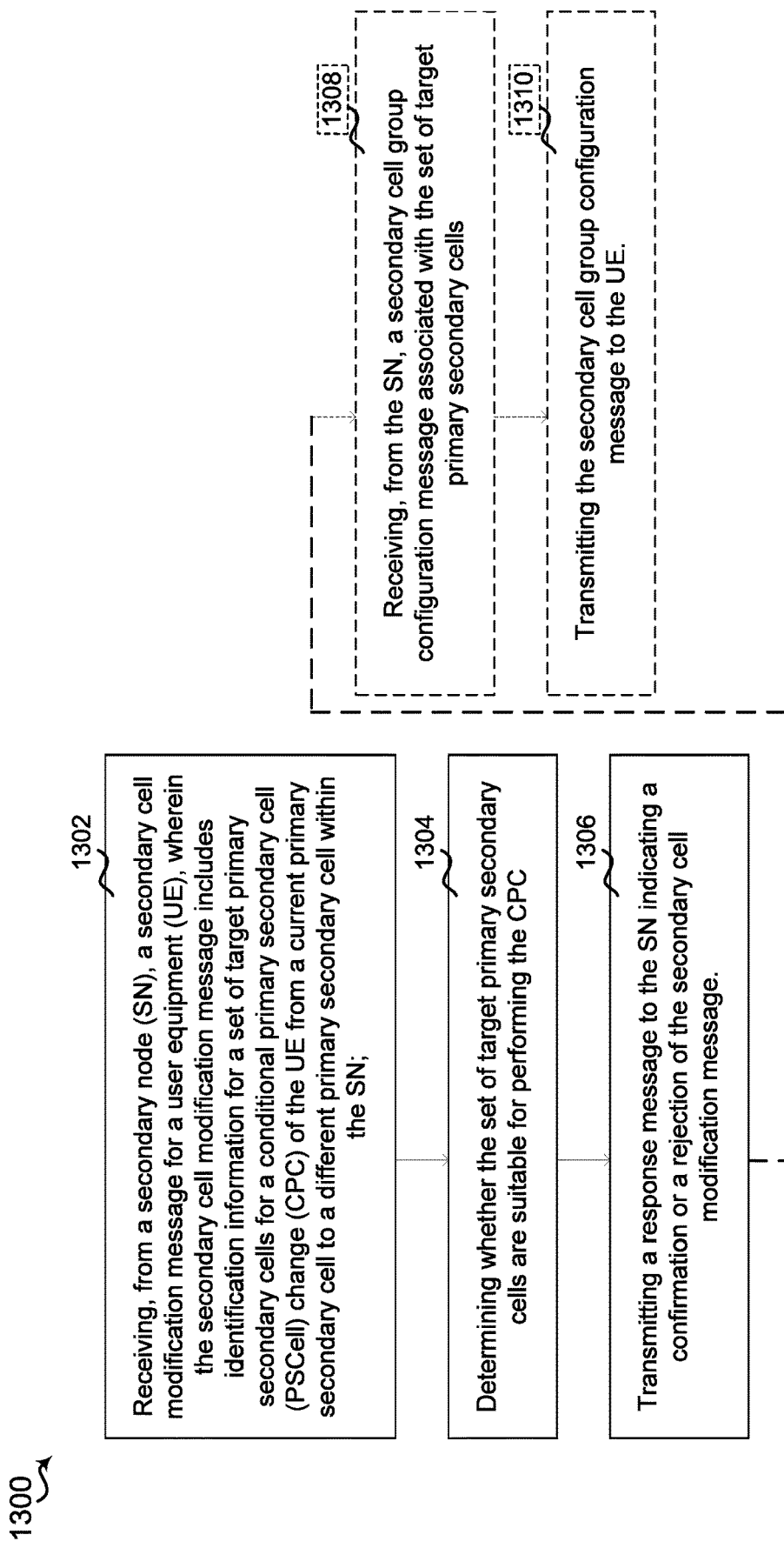
FIG. 13 is a flowchart of a first example method of wireless communication by the MN for avoiding CPC and CHO conflicts, as described herein.

In an optional aspect, referring to FIG. 11, at block 1102, the method 800 may further include performing a random access procedure with the UE associated with the one of the set of target primary SCG cells. For example, in an aspect, SN 103, processor 705, memory 710, CHO/CPC conflict component 105, and/or RACH performing component 755 may be configured to or may comprise means for performing a random access procedure with the UE associated with the one of the set of target primary SCG cells.

In this optional aspect, at block 1104, the method 800 may further include performing a PSCell change procedure with the UE. For example, in an aspect, SN 103, processor 705, memory 710, CHO/CPC conflict component 105, and/or cell change performing component 170 may be configured to or may comprise means for performing a PSCell change procedure with the UE.

Referring to FIGS. 12-17, in operation, the MN 115 may perform a method 1300 of wireless communication, by such as via execution of CPC/CHO component 117 by processor 1205 and/or memory 1210.

At block 1302, the method 1300 includes receiving, from a secondary node (SN), a secondary cell modification message for a user equipment (UE), wherein the secondary cell modification message includes identification information for a set of target primary SCG cells for a conditional primary SCG cell (PSCell) change (CPC) of the UE from a current primary SCG cell to a different primary SCG cell within the SN. For example, in an aspect, MN 115, processor 1205, memory 1210, CPC/CHO component 117, and/or receiving component 1220 may be configured to or may comprise means for receiving, from a secondary node (SN), a secondary cell modification message for a user equipment (UE), wherein the secondary cell modification message includes identification information for a set of target primary SCG cells for a conditional primary SCG cell (PSCell) change (CPC) of the UE from a current primary SCG cell to a different primary SCG cell within the SN.

At block 1304, the method 1300 includes determining whether the set of target primary SCG cells are suitable for performing the CPC. For example, in an aspect, MN 115, processor 1205, memory 1210, CPC/CHO component 117, and/or determining component 1225 may be configured to or may comprise means for determining whether the set of target primary SCG cells are suitable for performing the CPC.

At block 1306, the method 1300 includes transmitting a response message to the SN indicating a confirmation or a rejection of the secondary cell modification message. For example, in an aspect, MN 115, processor 1205, memory 1210, CPC/CHO component 117, and/or transmitting component 1230 may be configured to or may comprise means for transmitting a response message to the SN indicating a confirmation or a rejection of the secondary cell modification message.

For example, the transmitting at block 1306 may include the response message being a modification confirmation message indicating the confirmation of the secondary cell modification message, or being a modification refuse message indicating the rejection of all or a part of the secondary cell modification message. The modification refuse message can include a cause code that indicates a reason for the rejection and/or rejected cell information that identifies one or more of the set of target primary SCG cells that are not suitable target primary SCG cells.

In an optional aspect, at block 1308, the method 1300 may further include receiving, from the SN, a secondary cell group configuration message associated with the set of target primary SCG cells. For example, in an aspect, MN 115, processor 1205, memory 1210, CPC/CHO component 117, and/or receiving component 1220 may be configured to or may comprise means for receiving, from the SN, a secondary cell group configuration message associated with the set of target primary SCG cells.

In an optional aspect, at block 1310, the method 1300 may further include transmitting the secondary cell group configuration message to the UE. For example, in an aspect, MN 115, processor 1205, memory 1210, CPC/CHO component 117, and/or transmitting component 1230 may be configured to or may comprise means for transmitting the secondary cell group configuration message to the UE.

Figure 14:
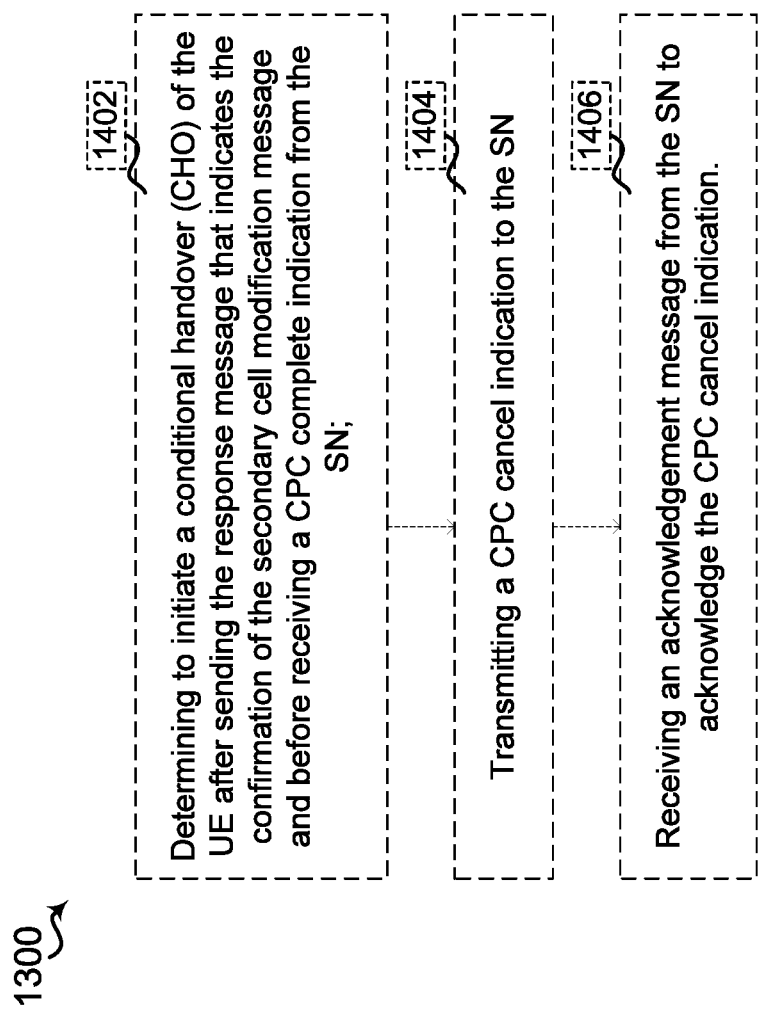
FIG. 14 is a flowchart of a second example method of wireless communication by the MN for avoiding CPC and CHO conflicts, as described herein.

In an optional aspect, referring to FIG. 14, at block 1402, the method 1300 may further include determining to initiate a conditional handover (CHO) of the UE after sending the response message that indicates the confirmation of the secondary cell modification message and before receiving a CPC complete indication from the SN. For example, in an aspect, MN 115, processor 1205, memory 1210, CPC/CHO component 117, and/or determining component 1245 may be configured to or may comprise means for determining to initiate a conditional handover (CHO) of the UE after sending the response message that indicates the confirmation of the secondary cell modification message and before receiving a CPC complete indication from the SN.

In this optional aspect, at block 1404, the method 1300 may further include transmitting a CPC cancel indication to the SN. For example, in an aspect, MN 115, processor 1205, memory 1210, CPC/CHO component 117, and/or transmitting component 1230 may be configured to or may comprise means for transmitting a CPC cancel indication to the SN.

The transmitting of the CPC cancel indication may include transmitting a modification request including the CPC cancel indication, and wherein receiving the acknowledgement message includes receiving a modification request acknowledgement message including a secondary cell group configuration in a cell group configuration information element.

In this optional aspect, at block 1406, the method 1300 may further include receiving an acknowledgement message from the SN to acknowledge the CPC cancel indication. For example, in an aspect, MN 115, processor 1205, memory 1210, CPC/CHO component 117, and/or receiving component 1220 may be configured to or may comprise means for receiving an acknowledgement message from the SN to acknowledge the CPC cancel indication.

Figure 15:
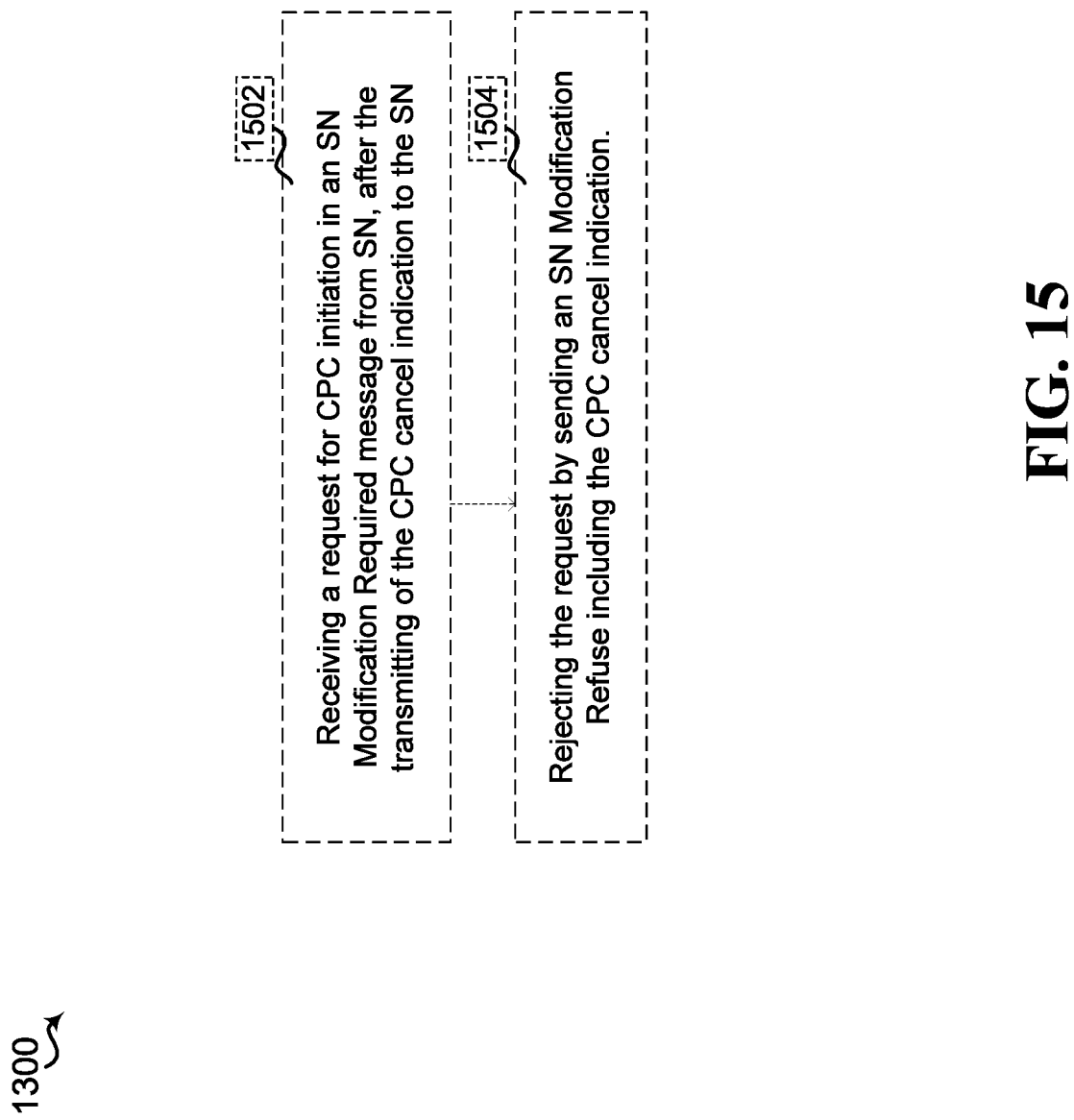
FIG. 15 is a flowchart of a third example method of wireless communication by the MN for avoiding CPC and CHO conflicts, as described herein.

Referring to FIG. 15, in an optional aspect, at block 1502, the method 1300 may further include receiving a request for CPC initiation in an SN Modification Required message from SN, after the transmitting of the CPC cancel indication to the SN. For example, in an aspect, MN 115, processor 1205, memory 1210, CPC/CHO component 117, and/or receiving component 1220 may be configured to or may comprise means for receiving a request for CPC initiation in an SN Modification Required message from SN, after the transmitting of the CPC cancel indication to the SN.

In this optional aspect, at block 1504, the method 1300 may further include rejecting the request by sending an SN Modification Refuse including the CPC cancel indication. For example, in an aspect, MN 115, processor 1205, memory 1210, CPC/CHO component 117, and/or rejecting component 1265 may be configured to or may comprise means for rejecting the request by sending an SN Modification Refuse including the CPC cancel indication.

Figure 16:
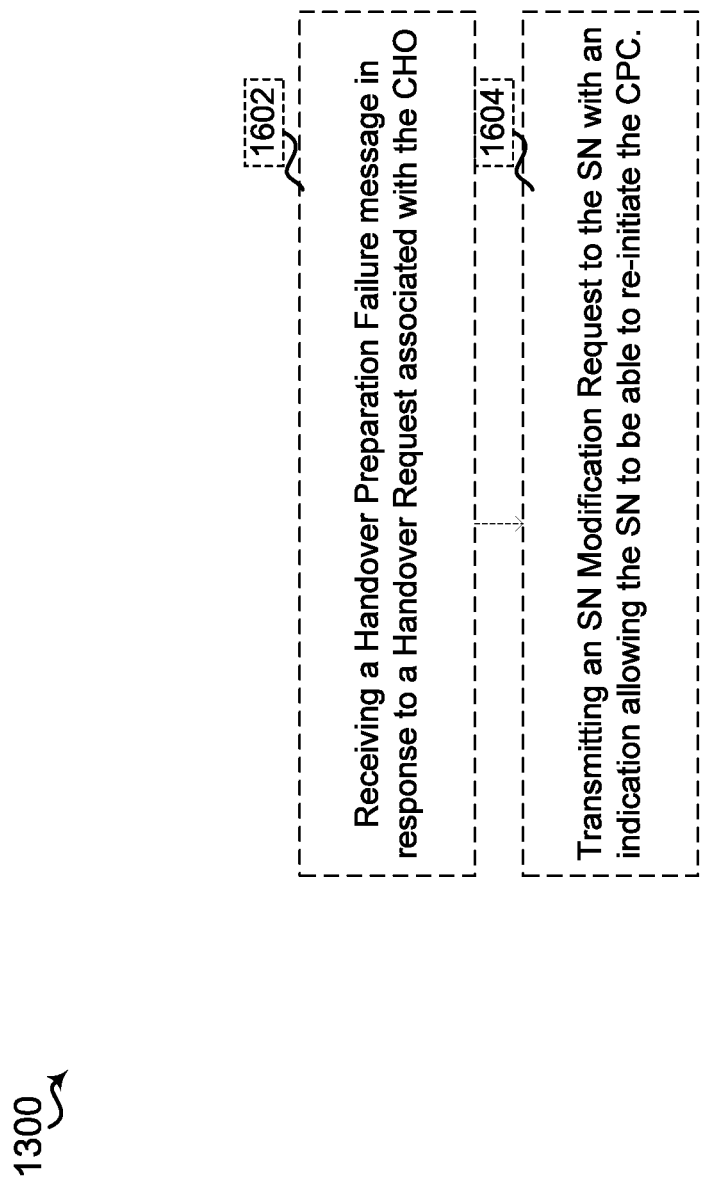
FIG. 16 is a flowchart of a fourth example method of wireless communication by the MN for avoiding CPC and CHO conflicts, as described herein.

Referring to FIG. 16, in another optional aspect, at block 1602, the method 1300 may further include receiving a Handover Preparation Failure message in response to a Handover Request associated with the CHO. For example, in an aspect, MN 115, processor 1205, memory 1210, CPC/CHO component 117, and/or receiving component 1220 may be configured to or may comprise means for receiving a Handover Preparation Failure message in response to a Handover Request associated with the CHO.

In this optional aspect, at block 1604, the method 1300 may further include transmitting an SN Modification Request to the SN with an indication allowing the SN to be able to re-initiate the CPC. For example, in an aspect, MN 115, processor 1205, memory 1210, CPC/CHO component 117, and/or transmitting component 1230 may be configured to or may comprise means for transmitting an SN Modification Request to the SN with an indication allowing the SN to be able to re-initiate the CPC.

Figure 17:
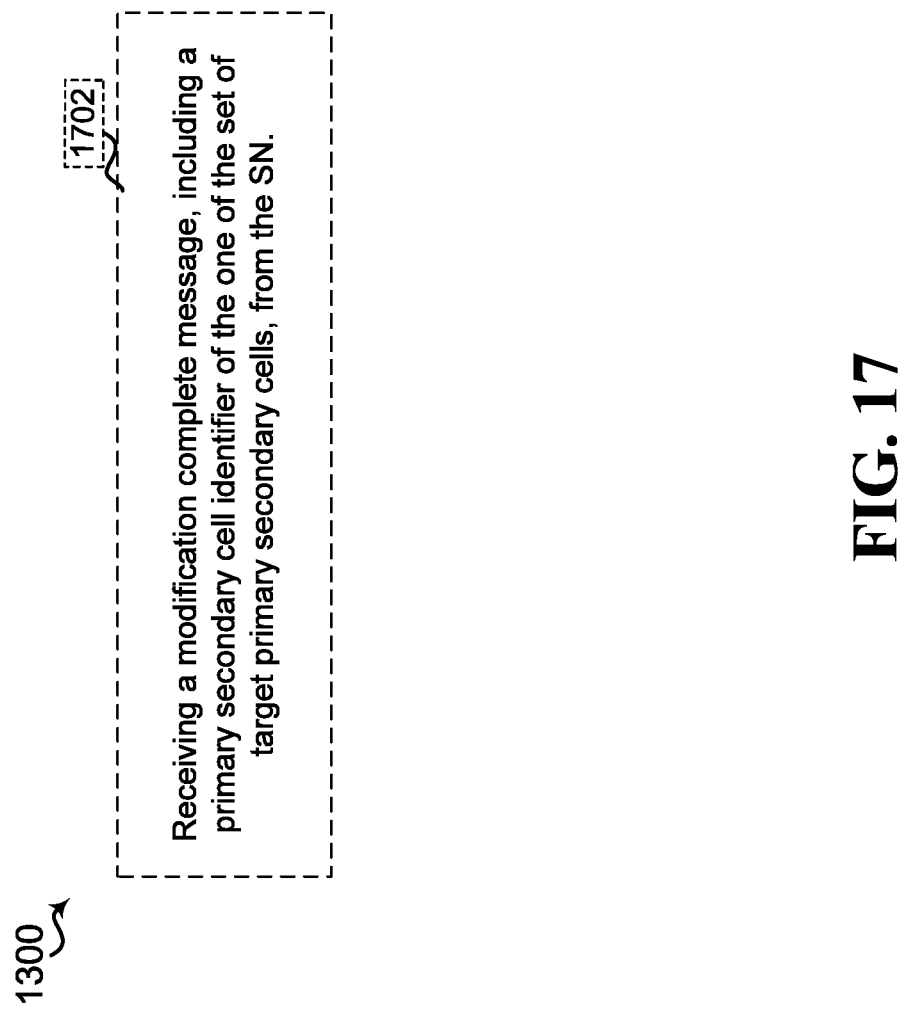
FIG. 17 is a flowchart of a fifth example method of wireless communication by the MN for avoiding CPC and CHO conflicts, as described herein.

Referring to FIG. 17, in an optional aspect, at block 1702, the method 1300 may further include receiving a modification complete message, including a primary SCG cell identifier of the one of the set of target primary SCG cells, from the SN. For example, in an aspect, MN 115, processor 1205, memory 1210, CPC/CHO component 117, and/or receiving component 1220 may be configured to or may comprise means for receiving a modification complete message, including a primary SCG cell identifier of the one of the set of target primary SCG cells, from the SN.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE), comprising: determining to perform conditional primary secondary cell group (SCG) cell (PSCell) change (CPC) of a user equipment (UE) to one of a set of target primary SCG cells within the SN different from a current primary SCG cell, generating a secondary cell modification message including identification information for the set of target primary SCG cells for the CPC, transmitting the secondary cell modification message including the identification information for the set of target primary SCG cells for the CPC to a master node (MN) associated with the UE, and receiving a response message from the MN indicating a confirmation or a rejection of the secondary cell modification message.

B. The method as paragraph A recites, wherein the secondary cell modification message further includes a secondary cell group configuration message configured for transmitting to the UE.

C. The method as any of paragraphs A-B recites, wherein the response message includes a modification confirmation message indicating the confirmation of the secondary cell modification message.

D. The method as any of paragraphs A-B recites, wherein the response message includes a modification refuse message indicating the rejection of all or a part of the secondary cell modification message.

E. The method as paragraph D recites, wherein the modification refuse message includes a cause code that indicates a reason for the rejection.

F. The method as paragraph D recites, wherein the modification refuse message includes rejected cell information that identifies one or more of the set of target primary SCG cells that are not suitable target primary SCG cells.

G. The method as any of paragraphs A-F recites, the method further comprising receiving a CPC cancel indication from the MN prior to the UE successfully accessing any one of the set of target primary SCG cells, transmitting a message to the UE to cancel the CPC, and transmitting an acknowledgement message to the MN to acknowledge the CPC cancel indication.

H. The method as paragraph G recites, wherein receiving the CPC cancel indication comprises receiving a modification request including the CPC cancel indication, and wherein transmitting the acknowledgement message includes transmitting a modification request acknowledgement message including a secondary cell group configuration in a cell group configuration information element.

I. The method as any of paragraphs A-H recite, the method further comprising performing a random access procedure with the UE associated with the one of the set of target primary SCG cells, and indicating a CPC complete with a modification complete message or an SN modification required message to the MN, after the UE successfully accesses a UE selected primary SCG cell from the set of target primary SCG cells, and including a UE selected primary SCG cell identifier of the UE selected primary SCG cell from the set of target primary SCG cells.

J. The method as any of paragraphs A-I recite, the method further comprising performing a random access procedure with the UE associated with the one of the set of target primary SCG cells, and performing a PSCell change procedure with the UE.

K. A user equipment for wireless communication, comprising a memory storing computer-executable instructions; and at least one processor coupled with the memory and configured to execute the computer-executable instructions to perform the method of any of claims A-J.

L. A user equipment for wireless communication, comprising means for performing the method of any of claims A-J.

M. A non-transitory computer-readable medium storing computer executable code, the code when executed by a processor causes the processor to perform the method of any of claims A-J.

N. A method of wireless communication at a master node (MN), the method comprising: receiving, from a secondary node (SN), a secondary cell modification message for a user equipment (UE), wherein the secondary cell modification message includes identification information for a set of target primary secondary cell group (SCG) cells (PSCell) for a conditional PSCell change (CPC) of the UE from a current primary SCG cell to a different primary SCG cell within the SN, determining whether the set of target primary SCG cells are suitable for performing the CPC, and transmitting a response message to the SN indicating a confirmation or a rejection of the secondary cell modification message.

O. The method as paragraph N recites, the method further comprising: receiving, from the SN, a secondary cell group configuration message associated with the set of target primary SCG cells, and transmitting the secondary cell group configuration message to the UE.

P. The method as any of paragraphs N-O recite, the method further comprising: receiving, from the SN, a secondary cell group configuration message associated with the set of target primary SCG cells, and transmitting the secondary cell group configuration message to the UE.

Q. The method as any of paragraphs N-P recite, wherein the response message includes a modification confirmation message indicating the confirmation of the secondary cell modification message.

R. The method as any of paragraphs N-P recite, wherein the response message includes a modification refuse message indicating the rejection of all or a part of the secondary cell modification message.

S. The method as paragraph R recites, wherein the modification refuse message includes a cause code that indicates a reason for the rejection.

T. The method as paragraph R recites, wherein the modification refuse message includes rejected cell information that identifies one or more of the set of target primary SCG cells that are not suitable target primary SCG cells.

U. The method as any of paragraphs N-T recites, the method further comprising determining to initiate a conditional handover (CHO) of the UE after sending the response message that indicates the confirmation of the secondary cell modification message and before receiving a CPC complete indication from the SN, transmitting a CPC cancel indication to the SN, and receiving an acknowledgement message from the SN to acknowledge the CPC cancel indication.

V. The method as paragraph U recites, wherein transmitting the CPC cancel indication comprises transmitting a modification request including the CPC cancel indication, and wherein receiving the acknowledgement message includes receiving a modification request acknowledgement message including a secondary cell group configuration in a cell group configuration information element.

W. The method as paragraph U recites, the method further comprising receiving a request for CPC initiation in an SN Modification Required message from SN, after the transmitting of the CPC cancel indication to the SN, and rejecting the request by sending an SN Modification Refuse including the CPC cancel indication.

X. The method as paragraph U recites, receiving a Handover Preparation Failure message in response to a Handover Request associated with the CHO, and transmitting an SN Modification Request to the SN with an indication allowing the SN to be able to re-initiate the CPC.

Y. The method as any of paragraphs N-X recites, the method further comprising receiving a modification complete message, including a primary SCG cell identifier of the one of the set of target primary SCG cells, from the SN.

Z. A base station for wireless communication, comprising a memory storing computer-executable instructions; and at least one processor coupled with the memory and configured to execute the computer-executable instructions to perform the method of any of claims N-Y.

AA. A base station for wireless communication, comprising means for performing the method of any of claims N-Y.

AB. A non-transitory computer-readable medium storing computer executable code, the code when executed by a processor causes the processor to perform the method of any of claims N-Y.

What is claimed is:

1. A method of wireless communication at a secondary node (SN), comprising:
    determining to perform conditional primary secondary cell group (SCG) cell (PSCell) change (CPC) of a user equipment (UE) to one of a set of target primary SCG cells within the SN different from a current primary SCG cell;
    generating a secondary cell modification message including identification information for the set of target primary SCG cells for the CPC;
    transmitting the secondary cell modification message including the identification information for the set of target primary SCG cells for the CPC to a master node (MN) associated with the UE;
    receiving a response message from the MN indicating a confirmation or a rejection of the secondary cell modification message;
    receiving a CPC cancel indication from the MN prior to the UE successfully accessing any one of the set of target primary SCG cells;
    transmitting a message to the UE to cancel the CPC; and
    transmitting an acknowledgement message to the MN to acknowledge the CPC cancel indication.

2. The method of claim 1, wherein the secondary cell modification message further includes a secondary cell group configuration message configured for transmitting to the UE.

3. The method of claim 1, wherein the response message includes a modification confirmation message indicating the confirmation of the secondary cell modification message.

4. The method of claim 1, wherein the response message includes a modification refuse message indicating the rejection of all or a part of the secondary cell modification message.

5. The method of claim 4, wherein the modification refuse message includes a cause code that indicates a reason for the rejection.

6. The method of claim 4, wherein the modification refuse message includes rejected cell information that identifies one or more of the set of target primary SCG cells that are not suitable target primary SCG cells.

7. The method of claim 1, wherein receiving the CPC cancel indication comprises receiving a modification request including the CPC cancel indication, and wherein transmitting the acknowledgement message includes transmitting a modification request acknowledgement message including a secondary cell group configuration in a cell group configuration information element.

8. The method of claim 1, wherein the secondary cell modification message is a first secondary cell modification message, the set of target primary SCG cells is a first set of target primary SCG cells, the response message is a first response message, and further comprising:
    transmitting a second secondary cell modification message including the identification information for a second set of target primary SCG cells for the CPC to the MN associated with the UE;
    receiving a second response message from the MN indicating a confirmation or a rejection of the second secondary cell modification message;
    performing a random access procedure with the UE associated with one of the second set of target primary SCG cells; and
    indicating a CPC complete with a modification complete message or an SN modification required message to the MN, after the UE successfully accesses a UE selected primary SCG cell from the second set of target primary SCG cells, and including a UE selected primary SCG cell identifier of the UE selected primary SCG cell from the second set of target primary SCG cells.

9. The method of claim 1, wherein the secondary cell modification message is a first secondary cell modification message, the set of target primary SCG cells is a first set of target primary SCG cells, the response message is a first response message, and further comprising:
    transmitting a second secondary cell modification message including the identification information for a second set of target primary SCG cells for the CPC to the MN associated with the UE;
    receiving a second response message from the MN indicating a confirmation or a rejection of the second secondary cell modification message;
    performing a random access procedure with the UE associated with the one of the second set of target primary SCG cells; and
    performing a PSCell change procedure with the UE.

10. An apparatus for wireless communication at a secondary node (SN), comprising:
    a memory; and
    a processor in communication with the memory configured to:
        determine to perform conditional primary secondary cell group (SCG) cell (PSCell) change (CPC) of a user equipment (UE) to one of a set of target primary SCG cells within the SN different from a current primary SCG cell;
        generate a secondary cell modification message including identification information for the set of target primary SCG cells for the CPC;
        transmit the secondary cell modification message including the identification information for the set of target primary SCG cells for the CPC to a master node (MN) associated with the UE;
        receive a response message from the MN indicating a confirmation or a rejection of the secondary cell modification message;

receive a CPC cancel indication from the MN prior to the UE successfully accessing any one of the set of target primary SCG cells;

transmit a message to the UE to cancel the CPC; and transmit an acknowledgement message to the MN to acknowledge the CPC cancel indication.

11. The apparatus of claim 10, wherein the secondary cell modification message further includes a secondary cell group configuration message configured for transmit to the UE.

12. The apparatus of claim 10, wherein the response message includes a modification confirmation message indicating the confirmation of the secondary cell modification message.

13. The apparatus of claim 10, wherein the response message includes a modification refuse message indicating the rejection of all or a part of the secondary cell modification message.

14. The apparatus of claim 10, wherein the processor is further configured to:

perform a random access procedure with the UE associated with the one of the set of target primary SCG cells; and perform a PSCell change procedure with the UE.

15. A method of wireless communication at a master node (MN), comprising:

receiving, from a secondary node (SN), a secondary cell modification message for a user equipment (UE), wherein the secondary cell modification message includes identification information for a set of target primary secondary cell group (SCG) cells (PSCell) for a conditional PSCell change (CPC) of the UE from a current primary SCG cell to a different primary SCG cell within the SN;

determining whether the set of target primary SCG cells are suitable for performing the CPC;

transmitting a response message to the SN indicating a confirmation or a rejection of the secondary cell modification message;

determining to initiate a conditional handover (CHO) of the UE after sending the response message that indicates the confirmation of the secondary cell modification message and before receiving a CPC complete indication from the SN;

transmitting a CPC cancel indication to the SN; and receiving an acknowledgement message from the SN to acknowledge the CPC cancel indication.

16. The method of claim 15, further comprising:

receiving, from the SN, a secondary cell group configuration message associated with the set of target primary SCG cells; and transmitting the secondary cell group configuration message to the UE.

17. The method of claim 15, wherein the response message includes a modification confirmation message indicating the confirmation of the secondary cell modification message.

18. The method of claim 15, wherein the response message includes a modification refuse message indicating the rejection of all or a part of the secondary cell modification message.

19. The method of claim 18, wherein the modification refuse message includes a cause code that indicates a reason for the rejection.

20. The method of claim 18, wherein the modification refuse message includes rejected cell information that identifies one or more of the set of target primary SCG cells that are not suitable target primary SCG cells.

21. The method of claim 15, wherein transmitting the CPC cancel indication comprises transmitting a modification request including the CPC cancel indication, and wherein receiving the acknowledgement message includes receiving a modification request acknowledgement message including a secondary cell group configuration in a cell group configuration information element.

22. The method of claim 15, further comprising:

receiving a request for CPC initiation in an SN Modification Required message from SN, after the transmitting of the CPC cancel indication to the SN; and rejecting the request by sending an SN Modification Refuse including the CPC cancel indication.

23. The method of claim 15, further comprising:

receiving a Handover Preparation Failure message in response to a Handover Request associated with the CHO; and transmitting an SN Modification Request to the SN with an indication allowing the SN to be able to re-initiate the CPC.

24. The method of claim 15, further comprising:

receiving a modification complete message, including a primary SCG cell identifier of one of the set of target primary SCG cells, from the SN.

25. An apparatus for wireless communication at a master node (MN), comprising:

a memory; and a processor in communication with the memory and configured to:

receive, from a secondary node (SN), a secondary cell modification message for a user equipment (UE), wherein the secondary cell modification message includes identification information for a set of target primary secondary cell group (SCG) cells (PSCell) for a conditional PSCell change (CPC) of the UE from a current primary SCG cell to a different primary SCG cell within the SN;

determine whether the set of target primary SCG cells are suitable for performing the CPC;

transmit a response message to the SN indicating a confirmation or a rejection of the secondary cell modification message;

determine to initiate a conditional handover (CHO) of the UE after sending the response message that indicates the confirmation of the secondary cell modification message and before receiving a CPC complete indication from the SN;

transmit a CPC cancel indication to the SN; and receive an acknowledgement message from the SN to acknowledge the CPC cancel indication.

26. The apparatus of claim 25, wherein the processor is further configured to:

receive, from the SN, a secondary cell group configuration message associated with the set of target primary SCG cells; and transmit the secondary cell group configuration message to the UE.

* * * * *